(12) United States Patent
Ueda et al.

(10) Patent No.: US 8,382,122 B2
(45) Date of Patent: Feb. 26, 2013

(54) GASKET

(75) Inventors: Takahisa Ueda, Sanda (JP); Atsushi Suehiro, Sanda (JP); Hisashi Maeda, Sanda (JP); Hiroki Tanabe, Sanda (JP)

(73) Assignee: Nippon Pillar Packing Co., Ltd., Osaka-Shi, Osaka (JP)

( * ) Notice: Subject to any disclaimer, the term of this patent is extended or adjusted under 35 U.S.C. 154(b) by 307 days.

(21) Appl. No.: 12/741,317

(22) PCT Filed: Oct. 10, 2008

(86) PCT No.: PCT/JP2008/068458
§ 371 (c)(1),
(2), (4) Date: May 4, 2010

(87) PCT Pub. No.: WO2009/060690
PCT Pub. Date: May 14, 2009

(65) Prior Publication Data
US 2010/0264607 A1 Oct. 21, 2010

(30) Foreign Application Priority Data

Nov. 5, 2007 (JP) ................................. 2007-287497
Nov. 5, 2007 (JP) ................................. 2007-287498

(51) Int. Cl.
*F02F 11/00* (2006.01)
*F16J 15/08* (2006.01)
(52) U.S. Cl. ...................... 277/592; 277/598; 277/654
(58) Field of Classification Search .......... 277/592–598, 277/650–654, 628, 630, 637
See application file for complete search history.

(56) References Cited

U.S. PATENT DOCUMENTS

| | | | | |
|---|---|---|---|---|
| 922,130 | A | * | 5/1909 | Goetze .......................... 277/612 |
| 3,230,290 | A | * | 1/1966 | Nelson et al. .................. 277/652 |
| 4,196,913 | A | | 4/1980 | Oka |
| 4,540,183 | A | * | 9/1985 | Schneider et al. ............ 277/312 |

(Continued)

FOREIGN PATENT DOCUMENTS

| | | |
|---|---|---|
| JP | 58-210342 | 12/1983 |
| JP | 63-69855 | 5/1988 |

(Continued)

*Primary Examiner* — Vishal Patel
(74) *Attorney, Agent, or Firm* — Rankin, Hill & Clark LLP

(57) ABSTRACT

A gasket having a concentrically waved metal sheet, i.e., a core member, which has a PTFE sheet or an inorganic sheet of sealing-property layered and bonded on each of its opposite surfaces. The gasket makes it possible to ensure a stable sealing-property for a long period of time with a low to a high fastening-load applied. The metal sheet has valley portions, which were conventionally vacant gaps, and are filled with powdered sealing member to be embedded from the beginning. Therefore, the PTFE sheet or the inorganic sheet at the valley portions of the metal sheet that conventionally could not be compressed with a low fastening-load applied is compressed and even with the low fastening-load applied can secure a fastening surface-pressure over the entire surface. Further, since it is possible to suppress the deformation of the sheet in quantity, which was conventionally large, the PTFE sheet or the inorganic sheet each of low-fluidity are arranged so as not to be broken with a high fastening-load applied and the thinner PTFE sheet or the thinner inorganic sheet can be used.

8 Claims, 6 Drawing Sheets

U.S. PATENT DOCUMENTS

| | | | |
|---|---|---|---|
| 5,558,347 A * | 9/1996 | Nicholson | 277/652 |
| 5,785,322 A * | 7/1998 | Suggs et al. | 277/615 |
| 6,457,726 B1 * | 10/2002 | Jung | 277/611 |
| 6,565,099 B1 * | 5/2003 | Ottinger et al. | 277/608 |
| 2004/0195782 A1 | 10/2004 | Bram et al. | |

FOREIGN PATENT DOCUMENTS

| | | |
|---|---|---|
| JP | 7-29360 | 6/1995 |
| JP | 2005-180660 | 7/2005 |

\* cited by examiner

Fig. 7
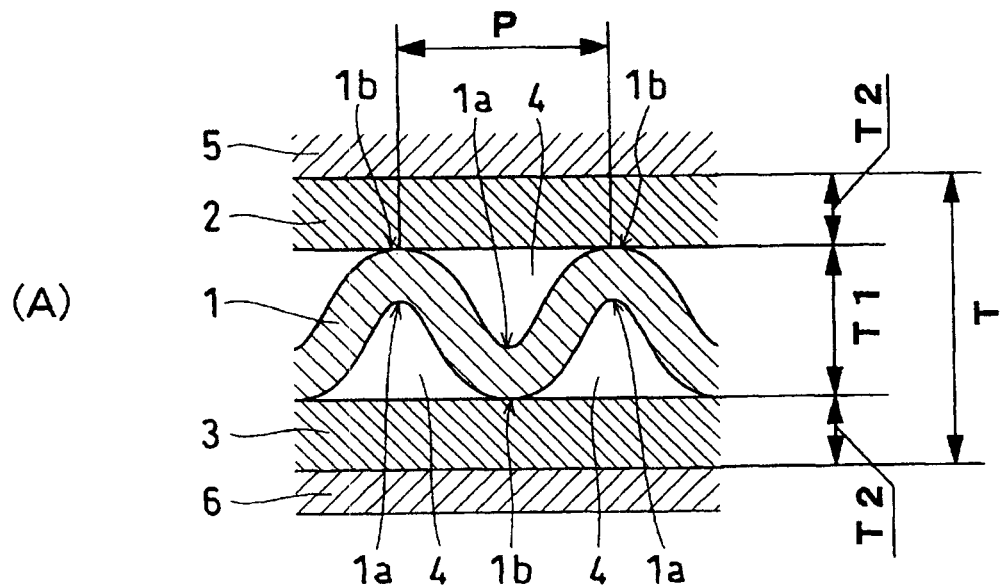
(A)
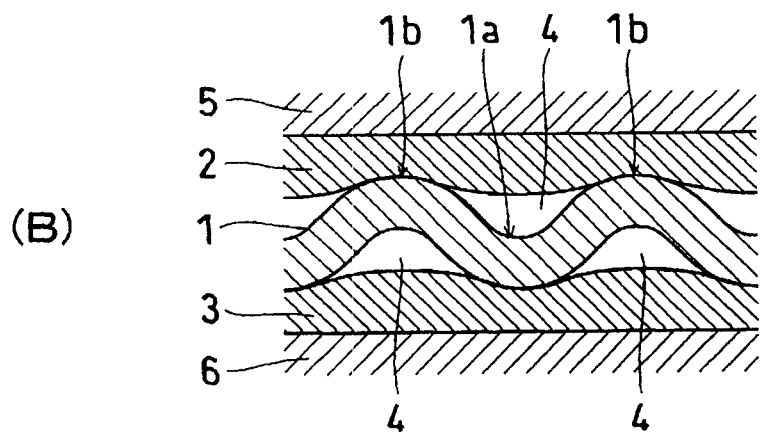
(B)
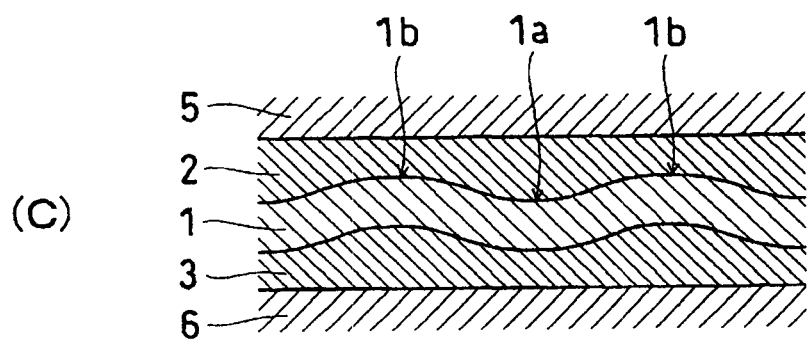
(C)

though they are hard to break, so as to realize a stable sealing-property even under a low fastening-load without being broken even under a high fastening-load.

GASKET

TECHNICAL FIELD

The present invention relates to a gasket which is employed for the usage that seeks a sealing-stability for a long period of time in a severe use-environment such as piping joint-portions (flanges of JIS or JPI standard) or joint portions of machines and instruments (bonnets of valves and the like).

BACKGROUND ART

Conventionally, there has been known such a structure that comprises a concentrically waved metal sheet having opposite surfaces on which expanded-graphite sheets are layered and bonded as a sealing member. This conventional structure employs the concentrically waved metal sheet instead of a core member which has conventionally comprised a flat metal plate or a metal plate which has opposite surfaces each provided with discontinuous concave and convex portions or worked into a structure having concave and convex portions like saw-teeth, so as to remarkably enhance the compression efficiency, which was extremely small before, and secure so high a deformation-following ability (following ability with respect to the accuracy of the flange-surface) that it can be used for the glass-lining flange distorted or waved. Further, a sheet made of expanded graphite has been utilized for the sealing member as it was done so conventionally. The opposite surfaces in contact with the flange are each formed from a sheet made of expanded graphite, which has a high fluidity and assures an excellent compatibility with the flange.

An explanation is given for a mechanism according to which such a conventional structure exerts the sealing function, with reference to the compression-deformation process of the conventional structure shown in FIG. 7(A) to FIG. 7(C). In these Figures, numeral 1 indicates a concentrically waved metal sheet that constitutes a core member. Numerals 2 and 3 designate expanded-graphite sheets layered and bonded on the opposite surfaces of the metal sheet 1. Numerals 4 and 5 each indicates a flange. Alphabetical letter (T) means a thickness of the gasket.

In a free state shown in FIG. 7(A) before fastening, the metal sheet 1 has an original wave-pitch (P) and wave-height (T1/2) (height (T1) of a mountain-like portion) and each of the expanded-graphite sheets 2 and 3 has an original thickness (T2) uniform in its entirety. There are formed vacant gaps 4 between valley portions 1a of the metal sheet 1 and the expanded-graphite sheets 2 and 3.

In a fastened state shown in FIG. 7(B) where a low fastening-load is applied, the metal sheet 1 is compressed between the mutually opposing flanges 5 and 6 in a direction of the thickness while it is decreasing its wave-height (T1/2) but increasing its wave-pitch (P), so that while making compression-deformation in the thickness-direction, it performs extension-deformation in a direction of the plane (radially inwards and outward). Although each of the expanded-graphite sheets 2 and 3 is compressed in the thickness-direction at the mountain-like portions 1b of the metal sheet 1, it is not compressed at the valley portions 1a of the metal sheet 1. Therefore, the conventional structure ensures a high fastening surface-pressure locally at the mountain-like portion 1b of the metal sheet 1 to exert a sealing-property. At this time, the expanded-graphite sheets 2 and 3 deform following the position-variation of the mountain-like portions 1b of the metal sheet 1 owing to their high fluidity. Then, without being broken, they are decreasing the thickness T2 at the mountain-like portions 1b of the metal sheet 1 while they are increasing it at the valley portions 1a of the metal sheet 1 to result in partly filling the vacant gaps 4.

In another fastened state shown in FIG. 7(C) where a high fastening-load is applied, the metal sheet 1 is more compressed between the mutually opposing flanges 5 and 6 in the direction of the thickness while it is further decreasing its wave-height (T1/2) but increasing its wave-pitch (P), so that while making further compression-deformation in the thickness-direction up to a state close to a flat plate, it performs further extension-deformation in a direction of the plane. At this time, the expanded-graphite sheets 2 and 3 deform following the position-variation of every mountain-like portion 1b of the metal sheet 1 owing to their high fluidity. Then, without being broken, they are further decreasing the thickness T2 at the mountain-like portions 1b of the metal-sheet 1 while they are more increasing it at the valley portions 1a of the metal sheet 1 with the result of ultimately filling the whole vacant gaps 4 completely. Thus the conventional structure exerts a stable sealing-property because the expanded-graphite sheets 2 and 3 are compressed also at the valley-portions 1a of the metal sheet in the thickness direction and secure the fastening surface-pressure over the entire surfaces of the mountain-like portions 1b and the valley portions 1a of the metal sheet 1.

The conventional structure is such that the concentrically waved metal sheet has opposite surfaces with the expanded-graphite sheets layered and bonded thereon and has been adopted for the gasket described, for example, in Patent Literature 1 and therefore it is publicly known.

Patent Literature: Utility Model Application Laid-Open No. 5-92574

DISCLOSURE OF THE INVENTION

Problem the Invention Attempts to Solve

Since the above-mentioned conventional structure uses an expanded graphite sheet for the sealing member, it can be used for the non-oxidizable fluids having a temperature of not more than 400° C. but is difficult to be used for the acid fluids. Then when a PTFE sheet, and an inorganic sheet such a mica sheet, a vermiculite sheet or a metal sheet are used, it has been found that those material cause the following problems. It is to be noted that the PTFE sheet is usable for most of the acid or alkaline fluids having a temperature of not more than 260° C. and the inorganic sheet as mentioned above is available for the acid fluids having a temperature of not less than 400° C.

More specifically, the conventional structure using a concentrically waved metal sheet for the core member, with a low fastening-load applied, it is difficult to ensure the fastening surface-pressure over the entire surface, and the sealing-stability is poor. On the other hand, with a high fastening-load applied, the PTFE sheet and the inorganic sheet are broken to invite the occurrence of leak because they are remarkably lower in fluidity than the expanded graphite sheet. The breakage of these sheets is avoidable if a sufficiently thick PTFE sheet or inorganic sheet is employed. However, such a sufficiently thick PTFE sheet or inorganic sheet is expensive, and besides with a low fastening-load applied, the PTFE sheet causes the penetration and leakage so that it fails to secure the sealing property and the inorganic sheet is so hard and low in compressibility that it can hardly obtain a stable sealing-property even with a high fastening-load applied.

In view of the forgoing problems, the present invention has been created and has an object to realize a gasket comprising a concentrically waved metal sheet, i.e. a core member, which has a PTFE sheet or an inorganic sheet of sealing-property layered and bonded on each of its opposite surfaces or which has opposite surfaces and an inner periphery each coated with a PTFE molded member or a metal molded member and at the same time to ensure a stable sealing-property for a long period of time with a low to a high fastening-load applied, by overcoming the problems.

Means for Solving the Problem

The gasket as defined in claim 1 in order to accomplish the above object, comprises a concentrically waved meal sheet: which has valley portions each filled with powdered sealing member and has a PTFE sheet or an inorganic sheet of sealing-property layered and bonded on each of its opposite surfaces.

The gasket as defined in claim 2 comprises a concentrically waved meal sheet which has valley portions each filled with powdered sealing member and has opposite surfaces and an inner periphery each coated with a PTFE molded member or a metal molded member of sealing-property.

A gasket as defined in claim 3 comprises the gasket as defined in claim 1 or 2, wherein the powdered sealing member is filled into the valley portions of the metal sheet with such a density that a fastening surface-pressure at every valley portion of the metal sheet becomes lower than that at every mountain-like portion thereof.

According to the gasket as defined in any one of claims 1 to 3, the metal sheet has valley portions, that were conventionally vacant gaps, are filled with powdered sealing member to be embedded from the beginning. Therefore, the PTFE sheet (claim 1) and the inorganic sheet (claim 1) at the valley portions of the metal sheet, that conventionally could not be compressed with a low fastening-load applied, can be compressed as well as the PTFE molded member (claim 2) and the metal molded member (claim 2) and even with the low fastening-load applied can secure a fastening surface-pressure over the entire surface with the result of being able to obtain a stable sealing-property. Further, since it is possible to suppress the deformation of the PTFE sheet and the inorganic sheet as well as the PTFE molded member and the metal molded member in the aspect of the quantity, the PTFE or inorganic sheet and the PTFE or metal molded member each of low-fluidity are not broken even with a high fastening-load applied. Besides, the thinner PTFE or inorganic sheet can be used as well as the thinner PTFE or metal molded member. Further, as for the PTFE sheet and the PTFE molded member, there is not caused such a concern that the penetration and leakage occur with a low fastening-load applied.

Moreover, the sealing member is arranged in two layers on each of the opposite surfaces of the metal sheet. Thus even if the PTFE sheet or the PTFE molded member, which is an outer sealing member, is broken, the inner sealing member can serve to seal, thereby enabling the sealing reliability to be enhanced. The inner sealing member and the outer sealing member may be made of the same material (i.e., PTFE) or may comprise a combination of different materials (expanded graphite, graphite leaves and so on).

Additionally, the sealing member to be filled into every valley portion of the metal sheet is powdered one that has high compressibility and fluidity so as not to inhibit the deformation of the metal sheet and damage the deformation-following ability of the gasket. Besides, any vacant gap is hardly produced at every valley portion of the metal sheet and therefore a fastening surface-pressure can be stably secured there. The powdered sealing member is inexpensive and also is so high in yield as to be usable without any waste. Thus it is economical.

The gasket as defined in claim 3 comprises a concentrically waved meal sheet, into the valley portions of which the powdered sealing member is filled with such a density that a fastening surface-pressure at every valley portion of the metal sheet becomes lower than that at every mountain-like portion thereof, in order that the fastening surface-pressure is distributed not uniformly nor reduced. This results in no increase of the minimum fastening force required for sealing purpose.

Effect of the Invention

The gasket as defined in any one of claims 1 to 3, can realize a gasket comprising a concentrically waved metal sheet, i.e., a core member, which has a PTFE sheet or an inorganic sheet layered and bonded on each of its opposite surfaces or which has opposite surfaces and an inner periphery each coated with a PTFE molded member or a metal molded member and at the same time can ensure a stable sealing-property for a long period of time with a low to a high fastening-load applied.

According to the gasket as defined in claim 3, when it is used, the strength required for the joint portion to the machine or instrument and to the piping does not become large and as a result does not necessitate to review the design or reconstruct the equipment and the device.

BRIEF DESCRIPTION OF THE DRAWINGS

FIGS. 7A-7C show a process of how the gasket of the conventional structure is compressed and deformed.

EXPLANATION OF NUMERALS

Figure 1:
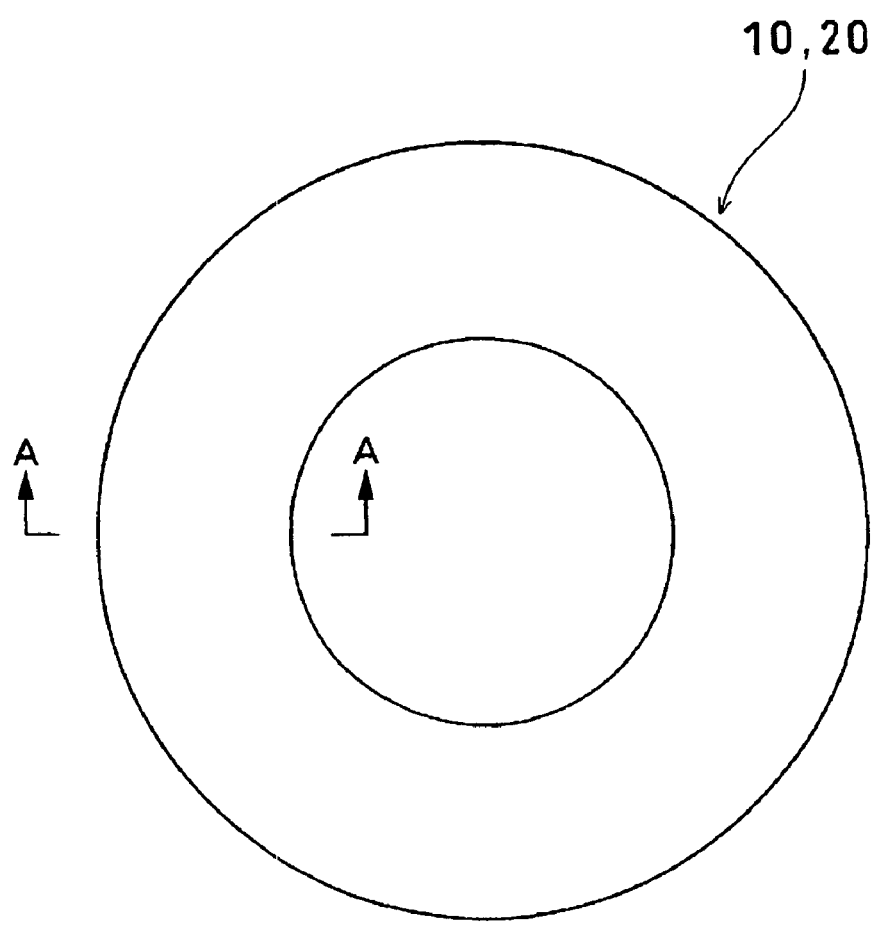
FIG. 1 is a plan view showing a gasket according to a first embodiment of the present invention.

10 gasket
11 waved metal sheet (metal sheet)
11*a* valley portion
11*b* mountain-like portion
12, 13 PTFE sheet
14 filling member (sealing member)
20 gasket
21 PTFE molded member (molded member)
30 gasket
32, 33 inorganic sheet
34 filling member (sealing member)
40 gasket
41 metal molded member

MOST PREFERRED EMBODIMENT OF THE INVENTION

Figure 2:
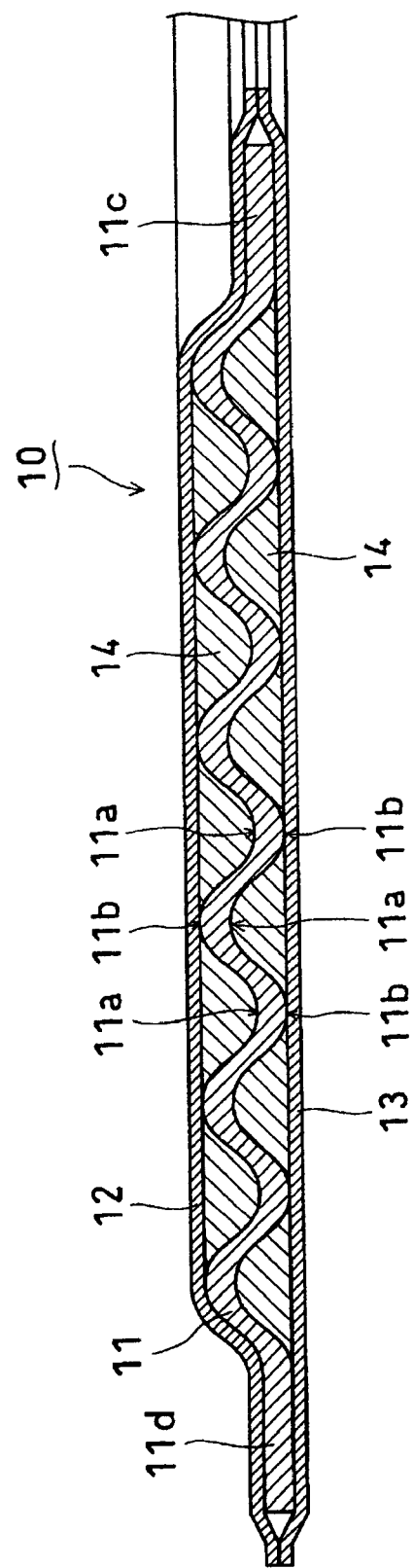
FIG. 2 is a sectional view showing a structure of the gasket according to the first embodiment of the present invention.

Hereafter, an explanation is given for an embodiment of a gasket according to the present invention with reference to the drawings. FIG. 1 is a plan view of a gasket according to a first embodiment of the present invention. FIG. 2 is a sectional view showing a structure of the gasket according to the first embodiment of the present invention.

A gasket 10 shown in FIGS. 1 and 2 comprises a concentrically waved circular ring-like metal sheet 11 (hereafter referred to only as 'waved metal sheet'), which is a core member, having circular ring-like PTFE sheets 12, 13 of sealing property layered and bonded on the outer and inner opposite surfaces. At portions (see FIG. 6) that were conventionally vacant gaps 4 (between valley portions 11a of the waved metal sheet 11 and the PTFE sheets 12, 13), the PTFE sheets 12 and 13 at the valley portions 11a of the waved metal sheet 11, which could not be compressed conventionally with a low fastening-load applied, can be compressed with the low fastening-load applied, so that a fastening surface-pressure can be secured over the entire surface and also a stable sealing-property can be obtained with a low fastening-load. This gasket suppresses the deformation of the PTFE sheets 12, 13 in quantity and therefore the PTFE sheets 12, 13 of low-fluidity are not broken with a high fastening-load applied. Further, in order to allow the use of the thinner PTFE sheets 12 and 13 and not to cause such a concern that the penetration and leakage likely occur in the PTFE sheets 12 and 13 with a low fastening-load applied, a powdered sealing member 14 (hereafter referred to only as 'filling member') is filled. This filling member 14 embeds the portions, which were conventionally vacant gaps 4, from the beginning. In consequence, the gasket 10 in concern has such a structure that comprises the waved metal sheet 11 having the PTFE sheets 12, 13 and the sealing member namely, the filling member 14 arranged on the outer and inner opposite surfaces in two, outer and inner, layers.

Here, the waved metal sheet 11 has an end edge on its inner periphery and an end edge on its outer periphery, which are provided with circular ring-like flat portions 11c: and 11d positioned, respectively on one plane which includes a top portion of every mountain-like portion 11b projecting toward one side (lower side in FIG. 2) of the waved metal sheet 11. Further, after the filling member 14 has been filled into the valley portions 11a, the waved metal sheet 11 has the outer and inner opposite surfaces an outer profile of which comprises one outer profile of the outer surface (upper side in FIG. 2) forming a three-dimensional shape with a portion between the surfaces of the flat portions 11c and 11d positioned on the same plane, raised as a trapezoidal shape of a low height and the other outer profile of the inner surface (lower side in FIG. 2) forming a planar shape with a portion between the inner surfaces of the flat portions 11c and 11d positioned on the same plane connected by a flat surface. The PTFE sheet 12 on the outer surface side of the waved metal sheet 11 is layered and bonded over a portion between an end portion of the flat portion 11c on the inner peripheral side of the waved metal sheet 11 and an end portion of the flat portion 11d on the outer peripheral side thereof, along the one outer profile of the three-dimensional shape of the outer surface of the waved metal sheet 11. The PTFE sheet 13 on the inner surface side of the waved metal sheet 11 is layered and bonded over a portion between the end portion of the flat portion 11c on the inner peripheral side of the waved metal sheet 11 and the end portion of the flat portion 11d on the outer peripheral side thereof, along the other cuter profile of the planar shape of the inner surface of the waved metal sheet 11. The PTFE sheets 12 and 13 have inner peripheral end edges projecting radially inwards from the end portion of the flat portion 11c on the inner peripheral side of the waved metal sheet 11, and adhered and fixedly attached to one another on a peripheral side inwards of the end portion of the flat portion 11c and within a thickness of the flat portion 11c. On the other hand, the PTFE sheets 12 and 13 have outer peripheral end edges projecting radially outwards from the end portion of the flat portion 11d on the outer peripheral side of the waved metal sheet 11, and adhered and fixedly attached to one another on a peripheral side outwards of the end portion of the flat portion 11d and within a thickness of the flat portion 11d.

The gasket 10 is produced by holding the waved metal sheet 11, which is a press-molded product, in a substantially horizontal posit on and, after the filling member 14 has been filled into the valley portions 11a on the upper surface side of the waved metal sheet 11, bonding one of the PTFE sheets 12 through an adhesive (not shown) in layered fashion to the upper surface (outer surface) of the waved metal sheet 11. Next, the waved metal sheet 11 is turned over and, after the filling member 14 is filled into the valley portions 11a on the upper surface side of the waved metal sheet 11, the other PTFE sheet 13 is bonded to the upper surface (inner surface) of the waved metal sheet 11 through the adhesive (not shown). At the same time, the PTFE sheets 12 and 13 have their inner peripheral end edges as well as their outer peripheral end edges, adhered and fixedly attached to one another, for completing the production of the gasket 10.

At this time, it is important to fill the filling member 14 into the valley portions 11a of the waved metal sheet with a density lower than that of each of the PTFE sheets 12 and 13 so that the fastening surface-pressure at every valley portion 11a of the waved metal sheet 11 becomes lower than that at the mountain-like portion 11b thereof. By filling the filling member 14 with such a density, the gasket 10 is formed into such a structure that the waved metal sheet 11 has the sealing member, namely, the filling member 14 (of a lower density) and the PTFE sheets 12, 13 (of a higher density), which are different from each other in density, arranged on its outer and inner opposite surfaces in two, inner and outer, layers.

Figure 3:
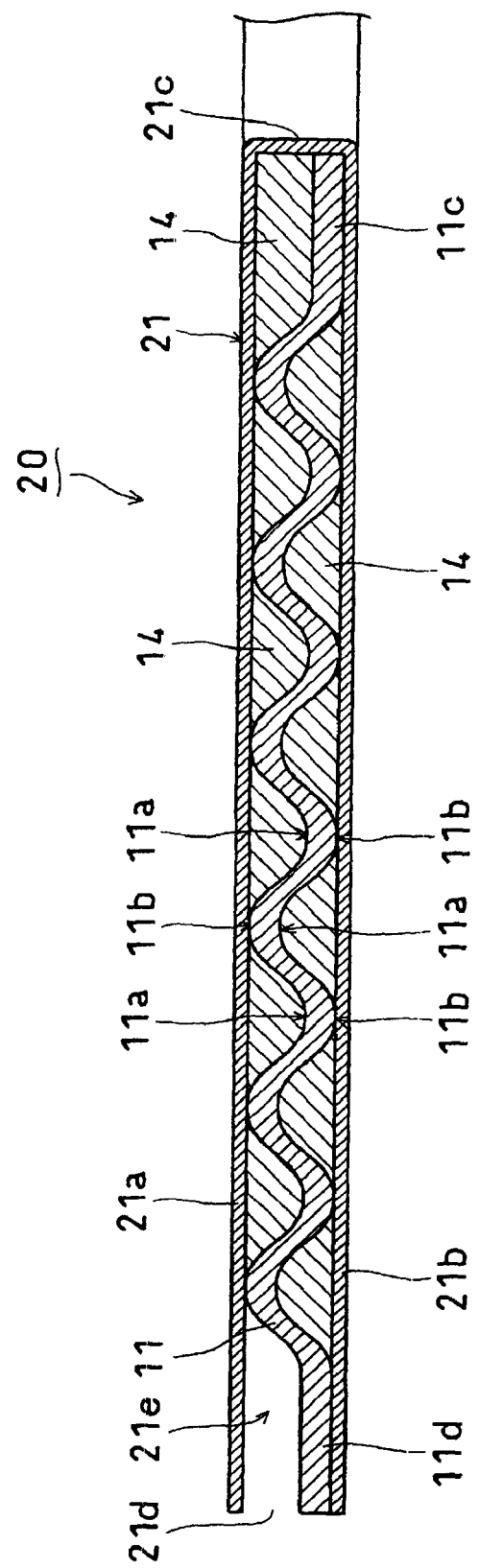
FIG. 3 is a sectional view showing a structure of a gasket according to a second embodiment of the present invention.

FIG. 3 is a sectional view showing the structure of a gasket according to the second embodiment of the present invention. The gasket according to the present embodiment has a plane identical to that of the gasket 10 shown in FIG. 1. Further, since the gasket of the present embodiment has the structure identical to that shown in FIG. 2 of the gasket 10 except the PTFE sheets, the identical constructions are designated by the identical numerals so as to omit the detailed explanation.

The gasket 20 illustrated in FIG. 3 comprises the waved metal sheet 11 having the outer and inner opposite surfaces and the inner periphery each continuously coated with a PTFE molded member 21 of an integral structure, produced by machining a circular ring-like PTFE flat plate). This PTFE molded member 21 includes mutually opposing circular ring-like sheet portions 21a and 21b in the thickness-direction, and a short cylindrical connection portion 21c continuously and integrally formed between end edges on the inner peripheral sides of those sheet portions 21a and 21b. There is formed a core-housing space 21e having an outer periphery provided with an opening 21d, inside the sheet portions 21a and 21b, and the connection portion 21c. The waved metal sheet 11 is attached to the core-housing space 21e. The sheet portions 21a and 21b are provided so as to extend from the upper and lower end portions of the short connection portion 21c made straightly upright inside the flat portion 11c on the inner peripheral side of the waved metal sheet 11 to the outer and inner opposite surface sides thereof.

The gasket 20 is produced by holding the PTFE molded member 21 in a horizontal position and rolling one of the sheet portions 21a on the upper surface side up to a cylindrical surface identical to that of the connection portion 21c and, after the waved metal sheet 11 has been fitted into the outer side of the connection portion 21c through the cylindrical sheet portion 21a from above, filling the filling member 14 into the valley portions 11a on the upper surface side of the waved metal sheet 11. Next, the cylindrical sheet portion 21a is returned to its original state and is bonded to the upper surface (outer surface) of the waved metal sheet 11 in layered fashion through an adhesive (not shown). Subsequently, the waved metal sheet 11 is turned over and another sheet portion 21b on the upper surface side is rolled up to the cylindrical surface identical to that of the connection portion 21c, and thereafter the filling member 14 is filled into the valley portions 11a on the upper surface side of the waved metal sheet 11. Then the cylindrical sheet portion 21b is returned to its original state and is bonded to the upper surface (inner surface) of the waved metal sheet 11 in layered fashion through the adhesive (not shown) for completing the production of the gasket 20. Regarding the density with which the filling member 14 is filled at this time, as it has been done for the above-mentioned gasket 10, it is important to fill the filling member 14 into the valley portions 11a of the waved metal sheet 11 with a density lower than that of the PTFE molded member 21.

It is to be noted that in the case of this gasket 20, there is formed a vacant space at an inside corner portion on its inner periphery (between the flat portion 11c of the waved metal sheet 11 and an end edge portion on an inner periphery of one of the sheet portions 21a). Accordingly, the filling member 14 is filled into that vacant space as well to embed it.

Since each of the gaskets 10, 20 constructed as mentioned above, exerts the sealing function according to the same mechanism, this mechanism is explained with reference to the process for the gasket 10, 20 to be compressed and deformed, as shown in FIGS. 4(A) to 4(C).

Figure 4:
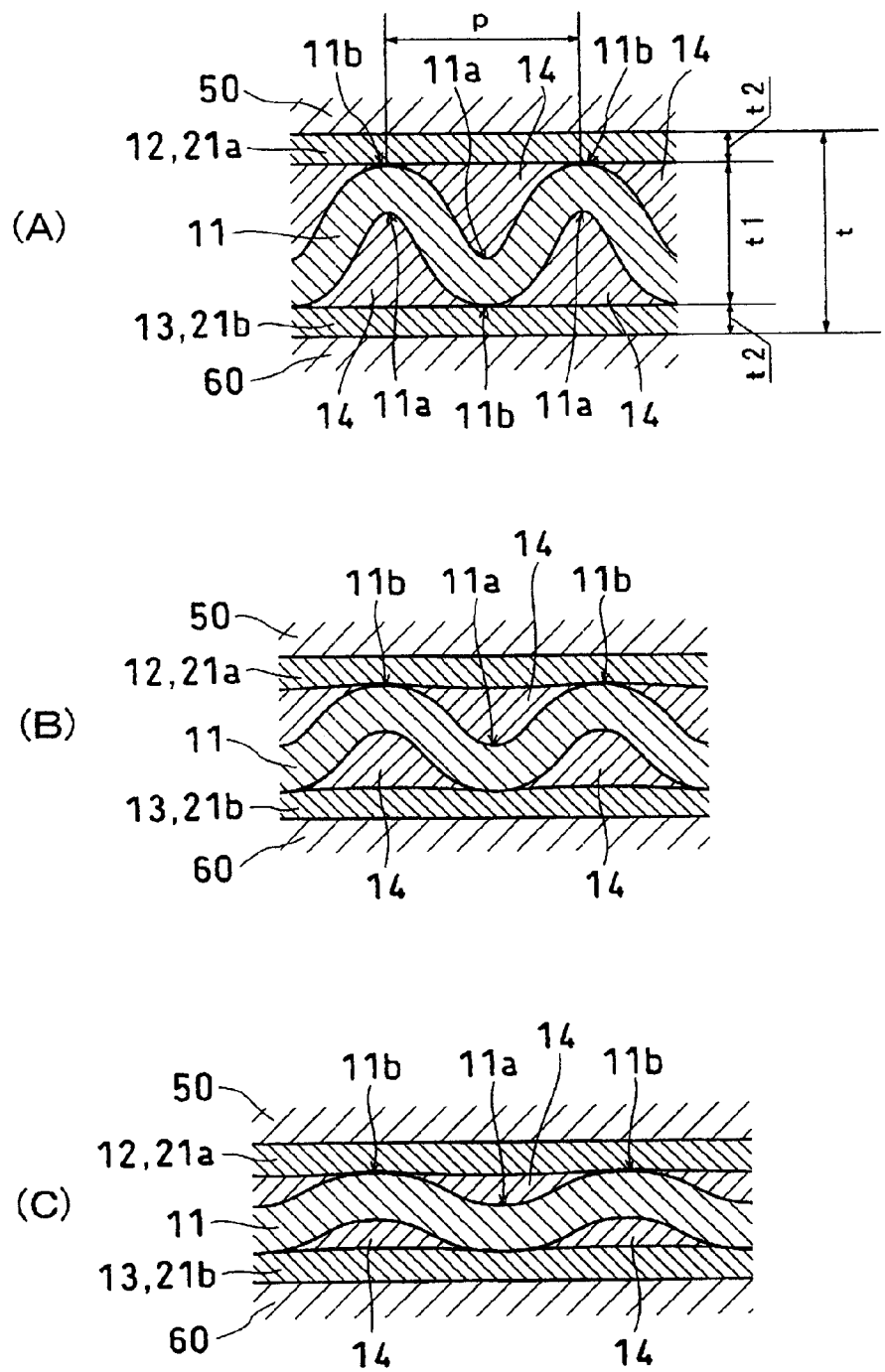
FIGS. 4A-4C show the process how the gasket according to the first and the second embodiments of the present invention is compressed and deformed.

In FIG. 4, numerals 50 and 60 designate flanges of the machine or instrument and the piping, respectively and alphabetical letter (t) indicates a thickness of the gasket.

In a free state shown in FIG. 4(A) before fastening, the metal sheet 11 has an original wave-pitch (p) and wave-height (t1/2) (height of the mountain-like portion (t1)). The PTFE sheets 12 and 13 each has a uniform thickness (t2) in its entirety as well as the sheet portions 21a and 21b of the PTFE molded member 21. The portion that was conventionally vacant gap 4 (between every valley portion 11a of the waved metal sheet 11 and the PTFE sheets 12 and 13, and the PTFE molded member 21) is filled with the filling member 14.

In a fastened state shown in FIG. 4(B) with a low fasting-load applied, the gasket 10, 20 is compressed in a thickness-direction between the mutually opposing flanges 50 and 60. Thus the waved metal sheet 11 is decreasing its wave-height (t1/2) but increasing its wave-pitch (p), so that while making compression-deformation in the thickness-direction, it also performs extension-deformation in a direction of the plane (radially inwards and outwards). The PTFE sheets 12 and are compressed in the thickness-direction at the mountain-like portions 11b of the waved metal sheet 11 as well as the sheet portions 21a and 21b of the PTFE molded member 21, and the waved meta sheet 11 has its valley portions 11a filled with the filling member 14. Thus the waved metal sheet 11 is also compressed at the valley portions 11a. As a result, the gasket 10, 20 secures a fastening surface-pressure over the entire surfaces of the mountain-like portions 11b and the valley portions 11a of the waved metal sheet 11, thereby allowing a stable sealing-property to be exerted.

In another fastened state shown in FIG. 4(C) with a high fastening-load applied, the gasket 10, 20 is more compressed in the thickness-direction between the mutually opposing flanges 50 and 60. Thus the waved metal sheet 11 is more decreasing its wave-height (t1/2) but increasing its wave-pitch (p), so that while making more compression-deformation in the thickness-direction to a state close to a flat plate, it also performs further extension-deformation in the direction of the plane. The PTFE sheets 12 and 13 are more compressed in the thickness-direction at the mountain-like portions 11b of the waved metal sheet 11 as well as the sheet portions 21a and 21b of the PTFE molded member 21, and the waved metal sheet 11 has its valley portions 11a filled with the filling member 14. Thus the waved metal sheet 11 is also more compressed at the valley portions 11a of the waved metal sheet 11. As a result, the gasket 10, 20 secures a higher fastening surface-pressure over the entire surfaces of the mountain-like portions 11b and the valley portions 11a of the waved metal sheet 11, thereby enabling the stable sealing-property obtained with the low fastening-load applied to be continuously maintained.

Thus, as for the gasket 10, 20, the waved metal sheet 11 has valley portions 11a that were conventionally vacant gaps 4 are filled with the filing member 14 to be embedded from the beginning. Therefore, the PTFE sheets 12, 13 as well as the sheet portions 21a and 21b of the PTFE molded member 21 at the valley portions 11a of the waved metal sheet 11 that conventionally could not be compressed with a low fastening-load applied can be compressed and even with the low fastening-load applied can secure a fastening surface-pressure over the entire surface with the result of being able to obtain a stable sealing-property with a low fastening-load applied. In consequence, it can secure a stable sealing-property for a long period of time with a low to a high fastening-load applied.

As such, as for the gasket 10, 20, the waved metal sheet 11 has valley portions 11a that were conventionally vacant gaps 4, filled with the filling member 14 to be embedded from the beginning. Therefore, the PTFE sheets 12, 13 as well as the PTFE molded member 21 suppresses the deformation in an attempt to embed the valley portions 11a of the waved metal sheet 11, thanks to their own fluidity and thickness, t1, t2 with the result of extremely decreasing the deformation of the PTFE sheets 12 and 13 as well as the sheet portions 21a and 21b of the PTFE molded member 21 in quantity. Therefore, the PTFE sheets 12 and 13, and the PTFE molded member 21, each of low fluidity, are not broken with a high fastening-load applied. Further, the thinner PTFE sheets 12 and 13 can be used as well as the thinner PTFE molded member 21. With a low fastening-load applied, there is not caused such a concern that the penetration and leakage occur in the PTFE sheets 12 and 13 as well as in the PTFE molded member 21.

Moreover, the gasket 10, 20 has such a structure that the waved metal sheet 11 has the sealing member, namely, the filling member 14 and the PTFE sheets 12, 13 or the sheet portions 21a and 21b of the PTFE molded member 21 arranged in two, outer and inner, layers on its outer and inner opposite surfaces. Thus even if the PTFE sheets 12 and 13 or the PTFE molded member 21, which are outer sealing members, are broken, the filling member 14, which is an inner sealing member, can serve to seal, thereby enabling the sealing reliability to be enhanced. The filling member 14, inner sealing member, and the PTFE sheets 12, 13 or the PTFE molded member 21, outer sealing members, may be made of the same material or may comprise a combination of different materials.

Additionally, as to the gasket 10, 20, the filling member 14 to be filled into every valley portion 11a of the waved metal sheet 11 is powdered one that has both of the compressibility and fluidity so high that it well follows the shape-variation of every valley portion 11a of the waved metal sheet 11 and is compressed and flowed within every valley portion 11a of the waved metal sheet 11 with the result of not inhibiting the deformation of the waved metal sheet 11 nor damaging the deformation-following ability of the gasket 10, 20. Besides, any vacant gap is hardly produced at every valley portion 11a of the waved metal sheet 11 and therefore a fastening surface-pressure can be stably secured there. The powdered filling member 14 is inexpensive and also is so high in yield as to be usable without any waste. Thus it is economical.

Further, in the gasket 10, 20, the waved meal sheet 11 has valley portions 11a filled with the filling member 14 with a density lower than that of each of the PTFE sheets 12 and 13 or the PTFE molded member 21. Thus even with any fastening load applied, the fastening surface-pressure at every valley portion 11a of the waved metal sheet 11 becomes lower than that at every mountain-like portion 11b thereof, so that the fastening surface-pressure is distributed not uniformly nor reduced. This results in no increase of the minimum fastening force required for sealing purpose. In consequence, when it is used, the strength required for the joint portion to the machine or instrument and to the piping does not become large and as a result does not necessitate to review the design or reconstruct the equipment and the device.

As mentioned above, as for the gasket 10, 20, it is possible to ensure the adaptability with the PTFE sheets 12 and 13 or the PTFE molded member 21, each of low fluidity, and to realize the usage of them. Accordingly, they are available for most of the acid or alkaline fluids having a temperature of not more than 260° C. Further, in this usage, usable for the filling member 14 are powdered PTFE, powdered graphite such as expanded graphite and graphite leaves, or inorganic materials such as mica, talc, vermiculite and the like in powdered state.

Additionally, as for the materials of the waved metal sheet 11, from the view-point of the temperature of the internal fluid and the anti-corrosion property to the internal fluid, as far as it is a metal sheet made of any one of copper, iron, mild steel, stainless steel, aluminum and the like, it can be used for any usage mentioned above.

Further, as a gasket according to another embodiment (third embodiment), there is a gasket 30 having the same structure as that of the gasket 10 according to the first embodiment except that the PTFE sheets 11, 12 and the filling member 14 in the first embodiment are replaced with inorganic sheets 31, 32 and filling member 34 which is an sealing member made of inorganic powdered material, respectively. The explanation for the third embodiment is the same as that for the above-mentioned first embodiment in which the PTFE sheets 11, 12 and the filling member 14 of the gasket 10 in the first embodiment are replaced with the inorganic sheets 31, 32 and the filling member 34 which is an sealing member made of inorganic powdered material, respectively and therefore is omitted.

Further, as a gasket according to still another embodiment (fourth embodiment), there is a gasket 40 having the same structure as that of the gasket 20 according to the second embodiment except that the PTFE molded member 21 and the filling member 14 in the second embodiment are replaced with a metal molded member 42 and the filling member 34 which is an sealing member made of inorganic powdered material, respectively. The explanation for the forth embodiment is the same as that for the above-mentioned first embodiment in which the PTFE molded member 21 and the filling member 14 of the gasket 20 in the second embodiment are replaced with the metal molded member 42 and the filling member 34 which is an sealing member made of inorganic powdered material, respectively and therefore is omitted.

Here, the above-mentioned gaskets 30 and 40 ensure the adaptability with the inorganic sheets 32 and 33 or the metal molded member 41, each of low fluidity, and realize the usage of them. Accordingly, a mica sheet, a vermiculite sheet or a metal sheet is used as an inorganic sheet, which is available for the acid fluids having a temperature of not less than 400° C. Further, in this usage, usable for the filling member 34 are mica, talc (inorganic mineral) and the like in powdered state.

EXAMPLES

Hereafter, Examples of the gaskets according to the first and the second embodiments of the present invention are explained.

A waved metal sheet (material: stainless steel [316L]), thickness: 0.55 mm, wave-pitch (p): 3.2 mm, wave-height (t1/2): 0.55 mm [height of the mountain-like portion (t1): 1.1 mm]) was used for the waved metal sheet 11 and a porous PTFE sheet (thickness (t2): 0.5 mm) was employed for each of the PTFE sheets 12 and 13, and PTFE powder (average particulate diameter of 50 μm) was used for the filling member 14 to form the gasket as shown in FIGS. 1 and 2 (hereafter referred to only as "Example 1").

Produced as Comparison Example of the Example 1 was a gasket (hereafter referred to only as "Comparison Example 1") of the same structure as that of the Example 1 except that the filling member 14 was not filled.

Figure 5:
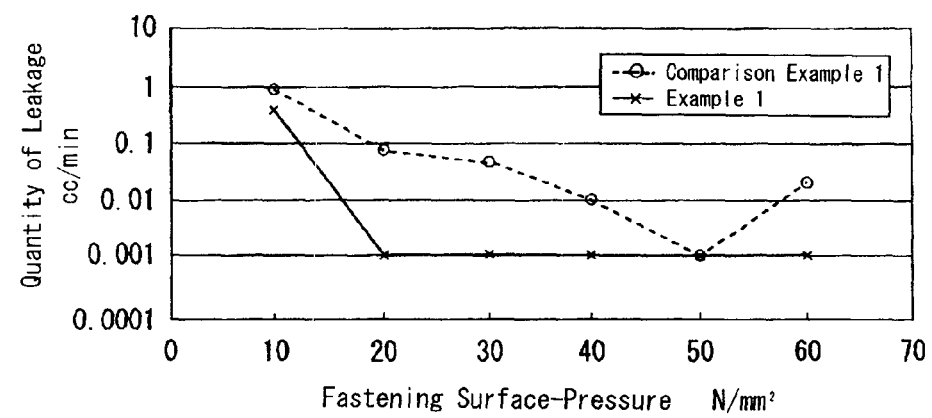
FIG. 5 is a line graph showing the sealing property of each of Example 1 and Comparison Example 1.

FIG. 5 illustrates a sealing-property of each of the Example 1 and the Comparison Example 1. The He (helium)-gas sealing test was conducted at the normal temperature for the Example 1 and the Comparison Example 1 so as to compare their sealing-properties with each other and the result is shown in FIG. 5. In FIG. 5, the Example 1 was excellent in the sealing-property with a low to a high fastening-load (surface-pressure) applied, when compared with the Comparison Example 1. Further, in Comparison Example 1, with a high fastening-load applied, the PTFE sheets 12 and 13 were broken to invite the occurrence of leakage. This has made it confirm that a stable sealing-property can be secured for a long period of time with a low to a high fastening-load applied and even the PTFE sheets 12 and 13 and the PTFE molded member 21 according to the second embodiment, each of low fluidity, can be used without being broken with a high fastening-load applied, by filling the valley portions 11a of the waved metal sheet 11, which were conventionally vacant gaps 4, with the filling member 14 to embed them from the beginning.

The relationship between the thickness of each of the PTFE sheets 12 and 13 (porous PTFE sheet) and the sealing-property as regards the Example 1 and the Comparison Example 1 is shown in the Table 1 described below.

TABLE 1

| Thickness of the sheet | Sealing-property | |
| --- | --- | --- |
| (mm) | Comparison Example 1 | Example 1 |
| 0.25 | x | ○ |
| 0.50 | x | ○ |
| 0.75 | Δ | ○ |
| 1.00 | ○ | ○ |
| 1.50 | ○ | ○ |

○: good, Δ: normal, x: bad

The He-gas sealing test was conducted for the Example 1 and the Comparison Example 1 while varying the thickness of each of the PTFE sheets 12 and 13 and the sealing-properties were mutually compared per thickness. The result is shown in this Table 1. In this Table 1, the Example 1 could obtain a stable sealing-property with the PTFE sheets 12 and 13 of a thickness (t2) remarkably smaller than that of the Comparison Example 1. This has made it confirm that the thinner PTFE sheets 12 and 13 or the thinner PTFE molded member 21 according to the second embodiment can be used by filling the valley portions 11a of the waved metal sheet 11, which were conventionally vacant gaps 4, with the filling member 14 to embed them from the beginning.

Next, examples of the gaskets according to the third and the fourth embodiments of the present invention are explained.

A waved metal sheet (material: stainless steel [316L]), thickness: 0.5 mm, wave-pitch (p): 3.2 mm, wave-height (t1/2): 0.55 mm [height of the mountain-like portion (t1)]: 1.1 mm) was used for the waved metal sheet 11 and a mica sheet (thickness (t2):0.5 mm) was employed for each of the inorganic sheets 32 and 33, and mica powder (average particulate diameter of 50 μm) was used for the filling member 34 to form the gasket as shown in FIGS. 1 and 2 (hereafter referred to only as "Example 2").

Produced as Comparison Example 2 of the Example 2 was a gasket (hereafter referred to only as "Comparison Example 2") of the same structure as that of the Example 2 except that the filling member 34 was not filled.

Figure 6:
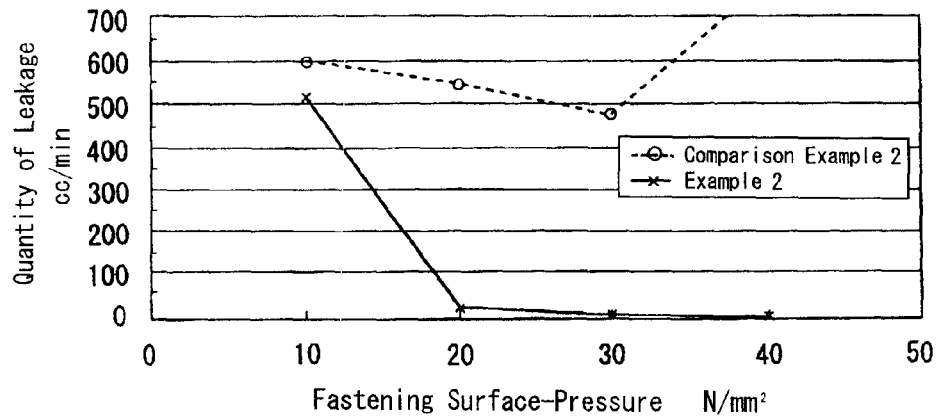
FIG. 6 is a line graph showing the sealing property of each of Example 2 and Comparison Example 2.

FIG. 6 illustrates a sealing-property of each of the Example 2 and the Comparison Example 2. The N2 (nitrogen)-gas sealing test was conducted at the normal temperature for the Example 2 and the Comparison Example 2 so as to compare their sealing-properties with each other and the result is shown in FIG. 6. In FIG. 6, the Example 2 was excellent in the sealing-property with a low to a high fastening-load (surface-pressure) applied, when compared with the Comparison Example 2. Further, as to the Comparison Example 2, the inorganic sheets 32 and 33 were broken with a high fastening-load applied to invite the occurrence of leakage. This has made it confirm that a stable sealing-property can be secured for a long period of time with a low to a high fastening load applied and even the inorganic sheets 32 and 33, and the metal molded member 41 according to the fourth embodiment, each of which was made of a low-fluidity material, can be used without being broken with a high fastening-load applied, by filling the valley portions 11a of the waved metal sheet 11, which were conventionally vacant gaps 4, with the filling member 34 to embed them from the beginning.

The relationship between the thickness of each of the inorganic sheets 32 and 33 (mica sheet) and the sealing-property as regards the Example 2 and the Comparison Example 2 is shown in the Table 2 described below.

TABLE 2

| Thickness of the sheet | Sealing-property | |
|---|---|---|
| (mm) | Comparison Example 2 | Example 2 |
| 0.10 | x | Δ |
| 0.25 | x | o |
| 0.50 | x | o |
| 0.75 | Δ | o |
| 1.00 | Δ | o | o: good, Δ: normal, x: bad

The N2-gas sealing test was conducted for the Example 2 and the Comparison Example 2 while varying the thickness of each of the inorganic sheets 32 and 33 and the sealing-properties were mutually compared per thickness. The result is shown in this Table 2. In this Table 2, the Example 2 could obtain a stable sealing-property with the inorganic sheets 32 and 33 of the standard thickness (t2) the Comparison Example 2 could not get. This has made it confirm that the thinner inorganic sheets 32 and 33 or the thinner metal molded member 41 according to the fourth embodiment each of which has the standard thickness, can be used by filling the valley portions 11a of the waved metal sheet 11, which were conventionally vacant gaps 4, with the filling member 14 to embed them from the beginning.

The invention claimed is:

1. A gasket comprising a concentrically waved metal sheet which has valley portions and peak portions on each of opposite surfaces thereof, said valley portions filled with powdered sealing member and has sheets having sealing property layered and bonded on each of opposite surfaces of the metal sheet,
    wherein said powdered sealing member is polytetrafluoroethylene powder;
    said powder is filled into the valley portions of the metal sheet with such a density that a fastening surface-pressure at every valley portion of the metal sheet becomes lower than that at every peak portion thereof; and
    said sheets are polytetrafluoroethylene sheets having a thickness of 0.25 mm or more and 0.5 mm or less.

2. A gasket comprising a concentrically waved metal sheet which has valley portions and peak portions on each opposite surfaces thereof, said valley portions filled with powdered sealing member and has sheets having sealing-property layered and bonded on each of opposite surfaces of the metal sheet,
    wherein said powdered sealing member is mica powder;
    said powder is filled into the valley portions of the metal sheet with such a density that a fastening surface-pressure at every valley portion of the metal sheet becomes lower than that at every peak portion thereof;
    said sheets are mica sheets having a thickness of 0.1 mm or more and 0.5 or less.

3. The gasket as defined in claim 1, wherein the concentrically waved metal sheet has the valley portions and peak portions on each of the opposite surfaces thereof;
    the powdered sealing member fills the valley portions on each of the opposite surfaces of the metal sheet; and
    the sheets are respectively layered over each of the opposite surfaces of the metal sheet and bonded on the peak portions of each of the opposite surfaces of the metal sheet.

4. The gasket as defined in claim 3, wherein the gasket, the concentrically waved metal sheet, and the sheets have a ring-shape;
    inner peripheral ends of the sheets extend radially inward from the metal sheet and are bonded to each other; and
    outer peripheral ends of the sheets extend radially outward from the metal sheet and are bonded to each other.

5. The gasket as defined in claim 4, wherein the concentrically waved, ring-shaped metal sheet further comprises ring-shaped flat portions that extend respectively radially inward and outward from the concentrically waved portion, the flat portions being positioned at a single plane that includes the peak portions of one of the opposite surfaces of the metal sheet.

6. The gasket as defined in claim 2, wherein the concentrically waved metal sheet has the valley portions and peak portions on each of the opposite surfaces thereof;
    the powdered sealing member fills the valley portions on each of the opposite surfaces of the metal sheet; and
    the sheets are respectively layered over each of the opposite surfaces of the metal sheet and bonded on the peak portions of each of the opposite surfaces of the metal sheet.

7. The gasket as defined in claim 6, wherein the gasket, the concentrically waved metal sheet, and the sheets have a ring-shape;

inner peripheral ends of the sheets extend radially inward from the metal sheet and are bonded to each other; and
outer peripheral ends of the sheets extend radially outward from the metal sheet and are bonded to each other.

8. The gasket as defined in claim 7, wherein the concentrically waved, ring-shaped metal sheet further comprises ring-shaped flat portions that extend respectively radially inward and outward from the concentrically waved portion, the flat portions being positioned at a single plane that includes the peak portions of one of the opposite surfaces of the metal sheet.

* * * * *